United States Patent
Kawada

(10) Patent No.: US 8,755,127 B2
(45) Date of Patent: Jun. 17, 2014

(54) OPTICAL APPARATUS

(71) Applicant: Canon Kabushiki Kaisha, Tokyo (JP)

(72) Inventor: Kazutoshi Kawada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/767,566

(22) Filed: Feb. 14, 2013

(65) Prior Publication Data

US 2013/0222926 A1    Aug. 29, 2013

(30) Foreign Application Priority Data

Feb. 29, 2012 (JP) ................. 2012-043061

(51) Int. Cl.
*G02B 15/14* (2006.01)
(52) U.S. Cl.
USPC .............................. 359/696; 359/697; 359/694
(58) Field of Classification Search
USPC .................... 359/696–704, 811–830
See application file for complete search history.

(56) References Cited

U.S. PATENT DOCUMENTS

| 7,986,469 B2 * | 7/2011 | Yumiki et al. ................ 359/694 |
| 8,379,135 B2 * | 2/2013 | Abe ............................. 348/345 |
| 8,462,445 B2 * | 6/2013 | Maniwa et al. ............... 359/696 |

FOREIGN PATENT DOCUMENTS

| JP | 05-002204 A | 1/1993 |
| JP | 05-241060 A | 9/1993 |

\* cited by examiner

*Primary Examiner* — Mohammed Hasan
(74) *Attorney, Agent, or Firm* — Rossi, Kimms & McDowell, LLP

(57) ABSTRACT

An optical apparatus includes a controller configured to control driving of a focus lens in manual focusing. A moving speed of the focus lens is expressed by a function of an operating speed of the operating unit, and the controller generates a control signal for the driver in accordance with the function. When the operating speed of the operating unit is equal to or lower than a threshold, the function is such a linear function that the moving speed of the focus lens linearly increases as the operating speed of the operating unit increases. When the operating speed of the operating unit is higher than the threshold, a differential value of the function increases as the operating speed of the operating unit increases. The function is continuous and smooth at the threshold.

14 Claims, 7 Drawing Sheets

OPTICAL APPARATUS

BACKGROUND OF THE INVENTION

1. Field of the Invention

The present invention relates to an optical apparatus configured to control manual focusing ("MF").

2. Description of the Related Art

Japanese Patent Laid-Open No. ("JP") 05-241060 discloses a method for changing a slope in a relationship between a variation amount of a rotating angle per a predetermined time period of a manual focusing ring used for the MF and a moving speed of a focus lens before and after a threshold of the variation amount of the rotating angle and for making the slope at a position equal to or higher than the threshold larger than that than at a position lower than the threshold. However, the relationship between the variation amount of the rotating angle and the moving speed is linear both in a range of the position equal to or higher than the threshold, and in a range of the position lower than the threshold.

JP 05-002204 discloses power focusing configured to change a ratio or (the rotating speed of the manual focusing ring)/(the moving speed of the focus lens) in accordance with a magnitude of the rotating speed of the focus lens, and to set the moving speed of the focus lens. The ratio may be (the rotating amount of the manual focusing ring)/(the moving amount of the focus lens). For example, assume that $V_0$ is the rotating speed of the manual focusing ring, V is the moving speed of the focus lens, $V_H$ and $V_L$ are two thresholds, and $t_V$ is an arbitrary value. Then, JP 05-002204 sets V so as to satisfy $V_0/V<t_V$ when $V_0>V_H$, $V_0/V=t_V$ when $V_H>V_0>V_L$, and $V_0/V>t_V$ when $V_L>V_0$.

JP 05-241060 has a problem of a bad operability because when the focus lens is rotated near the threshold, the gain frequently varies, the radical accelerations and decelerations of the focus lens frequently occur. According to JP 05-002204, V becomes discontinuous at $V_0=V_L$ and at $V_0=V_H$ in a graph in which the rotating speed $V_0$ is set to the abscissa axis and the moving speed V is set to the ordinate axis, because $V>V_0/t_V$ when $V_0>V_H$, $V=V_0/t_V$ when $V_H>V_0>V_L$, and $V<V_0/t_V$ when $V_L>V_0$. As a result, similar to JP 05-241060, the operability degrades near the threshold.

In addition, when a photographer provides finer MF by enlarging the display magnification of the display unit configured to display an image, a conventional variation amount of the focus lens is large and it is thus difficult to provide a fine adjustment.

SUMMARY OF THE INVENTION

The present invention provides an optical apparatus that has an improved operability of manual focusing.

An optical apparatus according to the present invention includes a controller configured to control driving of a focus lens by a driver in accordance with an operation of an operating unit in manual focusing. A moving speed of the focus lens is expressed by a function of an operating speed of the operating unit, and the controller generates a control signal for the driver in accordance with the function. When the operating speed of the operating unit is equal to or lower than a threshold, the function is such a linear function that the moving speed of the focus lens linearly increases as the operating speed of the operating unit increases. When the operating speed of the operating unit is higher than the threshold, a differential value of the function increases as the operating speed of the operating unit increases. The function is continuous at the threshold, and the differential value of the function at the threshold used when the operating speed of the operating unit is equal to or lower than the threshold is equal to the differential value of the function used at the threshold when the operating speed of the operating unit is higher than the threshold.

Further features of the present invention will become apparent from the following description of exemplary embodiments with reference to the attached drawings.

DESCRIPTION OF THE EMBODIMENTS

Figure 1:
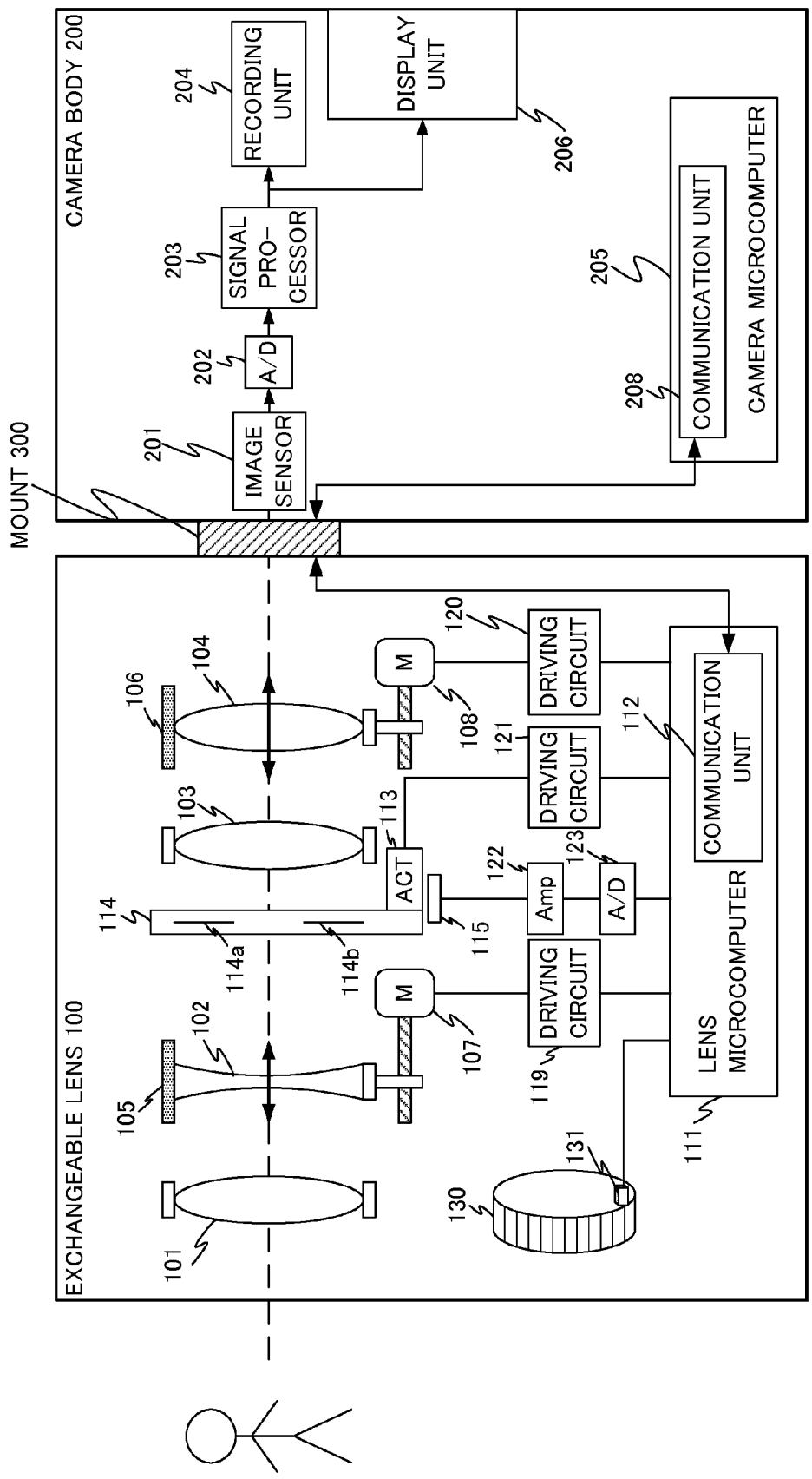
FIG. 1 is a block diagram of an optical apparatus according to a first embodiment of the present invention.

A detained description will now be given of embodiments of the present invention with reference to the accompanying drawings. In each figure, those elements which are corresponding elements will be designated by the same reference numerals, and a description thereof will be omitted.

First Embodiment

FIG. 1 is a block diagram of a camera system (optical apparatus) according to a first embodiment. The camera system includes an exchangeable lens (lens unit, optical apparatus) 100, and a camera body (image pickup apparatus, optical apparatus) 200. The exchangeable lens 100 is detachably attached to the camera body 200 via a mount 300.

The exchangeable lens 100 includes an image pickup optical system that includes a plurality of optical lens units, and the image pickup optical system forms an optical image of an object. The image pickup optical system of this embodiment includes, in order from an incident direction of the object image, a field lens 101, a zoom lens 102, a diaphragm unit 114 configured to adjust a light quantity, an afocal lens 103, and a focus lens 104, but this configuration is illustrative. Each of the zoom lens 102 and the focus lens 104 actually includes a plurality of lenses, and is made as a unit.

The zoom lens (magnification varying lens) 102 is held by a holding frame 105. The zoom lens 102 is moved in an optical axis direction (arrow direction in FIG. 1) by a motor 107 driven by a driving circuit 119, and changes a focal distance.

The diaphragm unit 114 adjusts a light quantity incident upon the image sensor 201 in the camera body 200. The diaphragm unit 114 includes aperture blades 114a and 114b, and the opening states of the aperture blades 114a and 114b are detected by a Hall element 115, and input into a lens microcomputer 111 via an amplifier 122 and an A/D converter 123.

The focus lens 104 is held by a holding frame 106. The focus lens 104 is moved in the optical axis direction (arrow direction in FIG. 1) by a motor 108 driven by a driving circuit 120 and provides focusing. A lens configuration in which the focus lens 104 is arranged on the backside viewed from the object side is referred to as a rear focus lens, and generally used for a small lens exchangeable camera and a compact digital camera.

The manual focusing ring 130 is an operating unit that is rotated in manual focusing ("MF") in which a photographer manually moves the focus lens 104 to an intended focus position, and a rotating amount, a rotating direction, and a rotating speed of the manual focusing ring are detected by a ring rotation detector 131. The manual focusing ring 130 of this embodiment is, but not limited to, an electronic ring that instructs the MF. For example, the structure of the operating unit is not limited to a ring shape, and its operation is not limited to the rotation but may be a linear movement.

The ring rotation detector 131 includes a photo-interrupter that includes a light emitting unit and a light receiving unit arranged opposite to each other, and a light shielding plate that moves with the manual focusing ring 130 and includes slits at regular intervals. As the manual focusing ring 130 moves, the light shielding plate gets inserted into the optical path and retreats from the optical path of the photo-interrupter. Hence, a light transmitting state and a light shielding state alternate in the photo-interrupter as the manual focusing ring 130 rotates. They are converted into a pulsed signal and input into the lens microcomputer 111.

The rotating direction of the manual focusing ring 130 is determined by identifying which of these two output waveforms advances. In addition, the rotating speed of the manual focusing ring 130 can be basically calculated by measuring a time period from an edge portion at which the level of the output waveform is switched to the next edge portion. However, when the two photo-interrupters are not arranged with an interval of a designed value, the size error appears as a time error of the output waveform and it becomes difficult to detect a precise rotating speed. As a solution for this problem, the same waveform edges provide a repetitive waveform and eliminate the size error. This edge interval time period is used to measure the operating ring speed. While this embodiment utilizes the photo-interrupter for the ring rotation detector 131, the present invention is not limited to this configuration and may use a capacity detector, a magnetic detector, or another detector.

The lens microcomputer 111 is a controller configured to control each component in the exchangeable lens 100 based upon commands from the operating unit, such as a zoom switch (not illustrated), and a camera microcomputer 205. The control over each component contains the MF control. In addition, the lens microcomputer 111 communicates with the camera microcomputer 205 in the camera body 200 via the communication unit 112. The lens microcomputer 111 includes memories (not illustrated), such as a ROM and a RAM, configured to store a protocol and data used for communications with the camera microcomputer 205 and an MF control method (program), which will be described later) and data used for the method, such as a variety of thresholds.

The lens microcomputer 111 outputs a control signal to the driving circuit 121 based upon an input signal from the A/D converter 123 and a command from the camera microcomputer 205. The driving circuit 121 drives the diaphragm actuator 113 based upon the control signal, and changes an aperture diameter of the diaphragm unit 114.

Each of the motors 107 and 108 is, but not limited to, an actuator, such as a stepping motor, in this embodiment, and may be another motor, such as a DC motor and a VCM. The motors 107 and 108 constitute the driver with the driving circuits 119 and 120. The lens microcomputer 111 outputs a control signal to each of the driving circuits 119 and 120 based upon the command from the camera microcomputer 205.

The lens microcomputer 111 controls driving of the focus lens 104 based upon the ring operation information detected by the ring rotation detector 131. In other words, the lens microcomputer 111 controls driving of the focus lens 104 by the driver in accordance with the rotation of the manual focusing ring 130 in the MF.

Figure 2A:
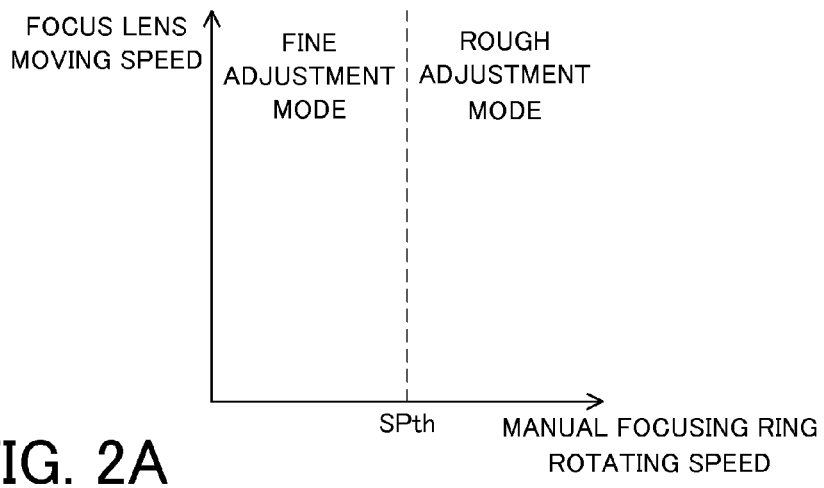
FIGS. 2A-2C are graphs each of which illustrates manual focusing control performed by a lens microcomputer illustrated in FIG. 1 according to the first embodiment.
Figure 2B:
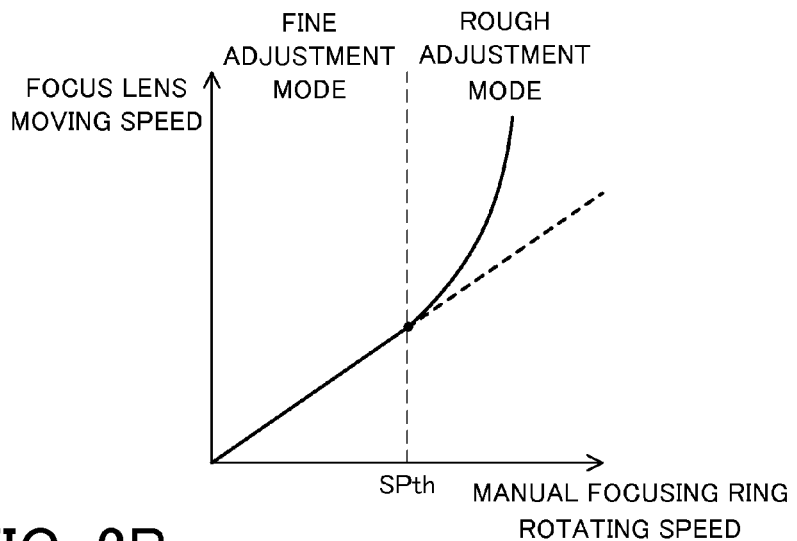
Figure 2C:
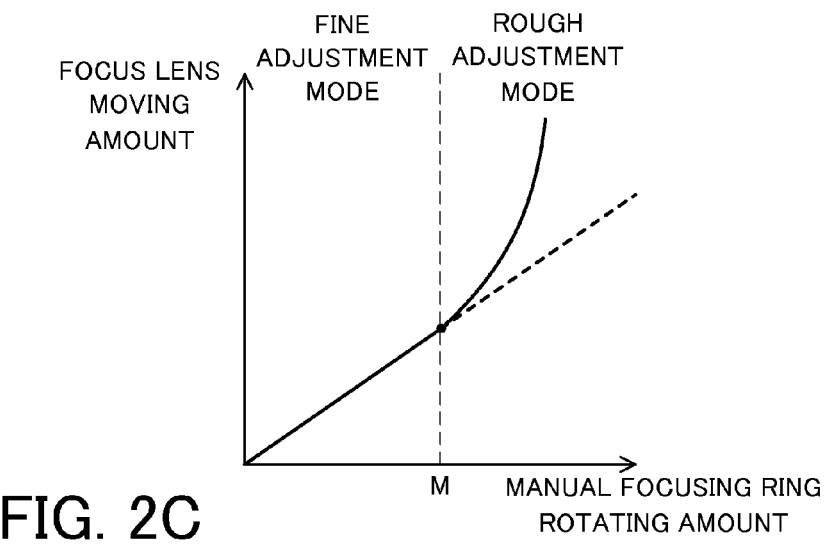

FIGS. 2A, 2B, and 2C are graphs of manual focus control performed by the lens microcomputer 111 according to the first embodiment. In FIGS. 2A, 2B, and 2C, an abscissa axis corresponds to an x axis, and an ordinate axis corresponds to a Y axis.

As illustrated in FIG. 2A, the lens microcomputer 111 provides control of a rough adjustment mode when the rotating speed of the manual focusing ring 130 is higher than a threshold SPth, and control of a fine adjustment mode when the rotating speed of the manual focusing ring 130 is equal to or lower than the threshold SPth. Thus, the lens microcomputer 111 switches the control between the fine adjustment mode and the rough adjustment mode based upon the rotating speed of the manual focusing ring 130. This is because when the photographer moves the focus lens 104 to a position in which the object distance is significantly different, the rotating speed of the manual focusing ring 130 is likely to be higher, and when the photographer moves the focus lens 104 near the current position, the rotating speed of the manual focusing ring 130 is likely to be lower.

FIG. 2B is a graph of one example of the rough adjustment mode and the fine adjustment mode, and FIG. 2C is a graph of another example of the rough adjustment mode and the fine adjustment mode. In FIG. 2B, the moving speed of the focus lens 104 is expressed as a function of the rotating speed (operating speed) of the manual focusing ring 130. Assume that the moving speed of the focus lens 104 is y and the rotating speed of the manual focusing ring 130 is x, the relationship between them is expressed as a function of y=f(x). In FIG. 2C, the moving amount of the focus lens 104 is expressed as a function of the rotating amount (operating amount) of the manual focusing ring 130. Assume that the moving amount of the focus lens 104 is y and the rotating amount of the manual focusing ring 130 is x, the relationship between them is expressed as a function of y=f(x). The lens microcomputer 111 generates a control signal for the driver in accordance with this function.

In the fine adjustment mode, the function is a linear function (y=ax: "a" is a positive number). In other words, the driving circuit 120 is controlled so that the moving speed of the focus lens 104 can linearly increase as the rotating speed of the manual focusing ring 130 increases. Alternatively, the driving circuit 120 is controlled so that the moving amount of the focus lens 104 can linearly increase as the rotating amount of the manual focusing ring 130 increases.

In general, the photographer learns an object distance using a position of the manual focusing ring 130 or an angle of his wrist grasping the manual focusing ring 130. In the fine adjustment mode, the rotating speed of the manual focusing ring 130 is proportional to the moving speed of the focus lens 104 or the rotating amount of the manual focusing ring 130 is proportional to the moving amount of the focus lens 104. Due to this linearity, when the photographer rotates his wrist from the defocus position to a position beyond an in-focus position and returns his wrist to the in-focus position, the MF becomes easy based upon the angle of the wrist (rotating position of the manual focusing ring 130).

In the control of the rough adjustment mode, a differential value of the above function (value of f'(x)) increases as the rotating speed of the manual focusing ring 130 increases. "f(x)" is a quadratic or higher function (for instance, f(x) is expressed as $y=kx^n+b$ where n is a second or higher order, and k and b are coefficients) and an exponential function. That the differential value of the function "increases" from the boundary position means that the curve of the rough adjustment mode is located above (in an area of y≥ax) a broken extension line of the fine adjustment mode. Thereby, in the rough adjustment mode, the photographer can quickly move the focus lens 104 to the position in which the object distance is significantly different, with a smaller operating amount of the manual focusing ring 130 than that of the fine adjustment mode.

At the threshold (at the boundary portion between the rough adjustment mode and the fine adjustment mode), the above function is continuous. Moreover, at the threshold, the differential value (a slope of the tangential line) of the function used for the rough adjustment mode and the differential value of the function used for the fine adjustment mode are equal to each other. In the above example, $a=nkSPth^{n-1}$ is established. This means that the function y=f(x) is continuous and smooth at the threshold. This configuration solves the problem of the bad operability in which when the manual focusing ring 130 is rotated near this boundary, the radical accelerations and decelerations of the focus lens 104 frequently occur. The differential function (change rate or increasing rate) of the above function may be referred to as a "control gain" in this application. In FIG. 2C, M is a boundary position between the fine adjustment mode and the rough adjustment mode.

The camera body 200 is configured as a single-lens reflex camera, but the present invention is applicable to another image pickup apparatus, such as a lens integrated camera, a digital video camera, and a mirror-less camera. The camera body 200 includes an image sensor 201, an A/D converter 202, a signal processor 203, a recording unit 204, a camera microcomputer 205, and a display unit 206.

The image sensor 201 is a CCD sensor or a CMOS sensor configured to photoelectrically convert an optical image formed by the image pickup optical system in the exchangeable lens 100 into an electric analog signal. The A/D converter 202 converts the analog signal output from the image sensor 201 into the digital signal. The signal processor 203 provides various image processing for the input digital signal. This configuration generates focus information representative of an in-focus state of an image and brightness signal information representative of an exposure state, and provides a conversion into a recordable data format. The recording unit 204 records an output signal (image signal) from the signal processor 203. The display unit 206 displays an object image generated by the signal processor 203, and enables the photographer to confirm a composition of the pickup object (object image to be captured), an in-focus state, etc. on a real-time basis.

The camera microcomputer 205 is a controller configured to control the camera body in accordance with inputs from an image pickup command switch (not illustrated) and a camera setting related switch (not illustrated), and to communicate with the lens microcomputer 111 via the communication unit 208. In addition, the camera microcomputer 205 issues an operational request and settings for the exchangeable lens 100 to the lens microcomputer 111 such as a driving request of each of the zoom lens 102, the diaphragm unit 114, and the focus lens 104, and a control setting of the manual focusing ring 130.

The mount 300 mechanically connects the exchangeable lens 100 with the camera body 200 so that they can communicate with each other. The communication mode is not limited to the electric communication or the optical communication. The power is supplied from the camera body 200 to the exchangeable lens 100 via the mount 300.

Figure 3:
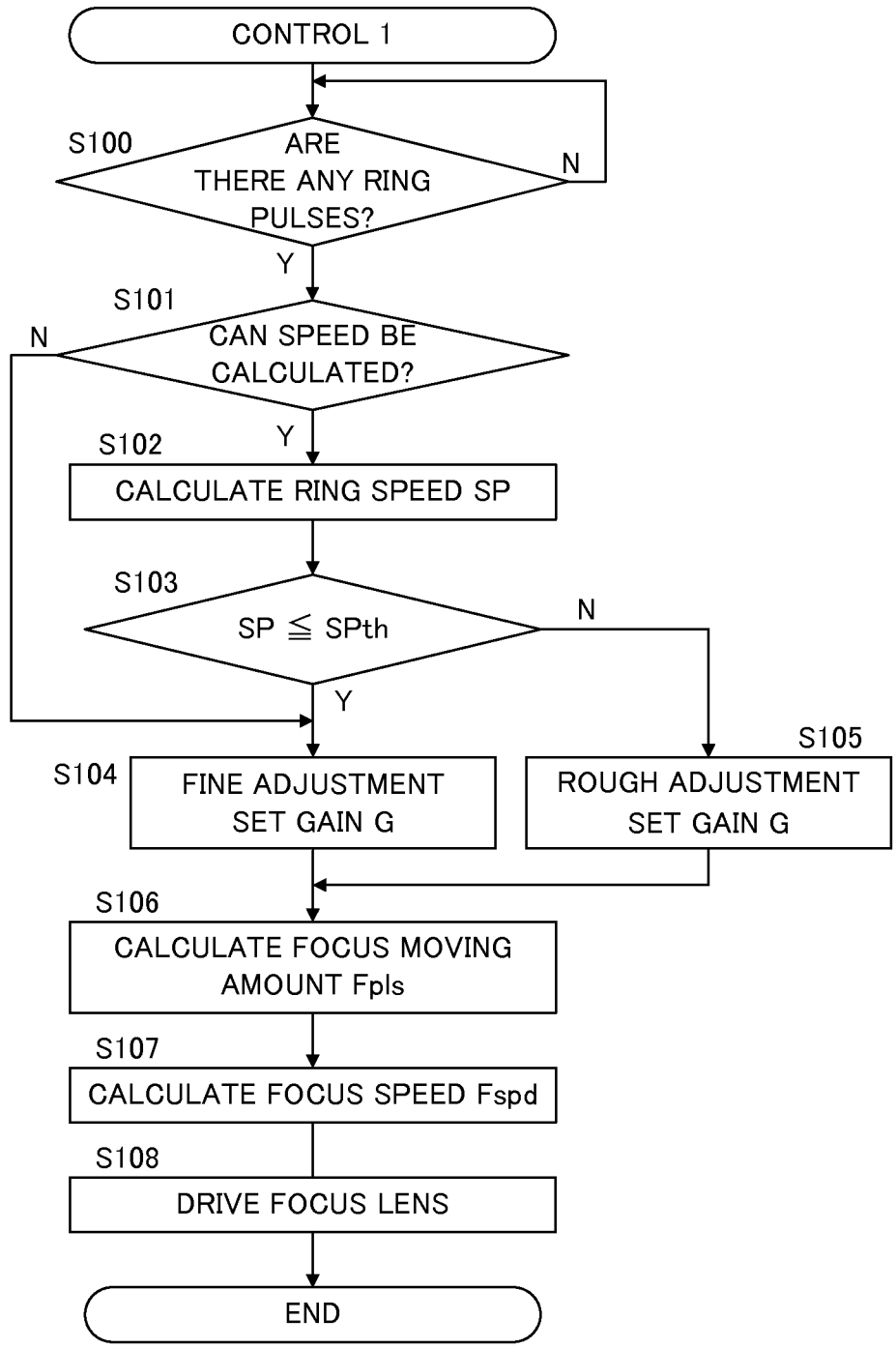
FIG. 3 is a flowchart for explaining a manual focusing control method performed by the lens microcomputer illustrated in FIG. 1 according to the first embodiment.

FIG. 3 is a flowchart for explaining an MF control method (control 1) performed by the lens microcomputer 111 according to the first embodiment, and "S" stands for the "step." "N" stands for "No," and "Y" stands for "Yes." The flowchart illustrated in FIG. 3 can be implemented as a program that enables a computer to realize a function of each step.

Initially, the lens microcomputer 111 determines whether the manual focusing ring 130 is rotated, based upon an input of a detection pulse from the ring rotation detector 131 (S100). Unless the manual focusing ring 130 is rotated (N of S100), the state is monitored at S100 until the rotation of the manual focusing ring 130 is detected.

When the manual focusing ring 130 is rotated (Y of S100), the lens microcomputer 111 determines whether the rotating speed SP of the manual focusing ring 130 can be calculated (S101). When it can be calculated (Y of S101), the lens microcomputer 111 calculates the rotating speed SP of the manual focusing ring 130 (S102). Unless the time interval between the corresponding edge positions is obtained from the photo-interrupter outputs, the rotating speed of the manual focusing ring 130 cannot be calculated. Therefore, the flow moves to S104 in that period.

After S102, the lens microcomputer 111 determines whether the rotating speed SP of the manual focusing ring 130 is equal to or lower than the threshold SPth (S103). As explained with reference to FIG. 2A, when the value is equal to or lower than the threshold (Y of S103), the fine adjustment mode is selected (S104) and when the value is higher than the threshold (N of S103), the rough adjustment mode is selected (S105).

In the fine adjustment mode, the lens microcomputer 111 sets the control gain G to the constant value "a" (S104). "a" is determined based upon a variety of characteristics of the exchangeable lens 100, more specifically, such as a diameter of the manual focusing ring 130, a density of the slit interval size of the light shielding plate of the ring rotation detector 131, the sensitivity of the focus movement relative to the moving amount of the focus lens 104 in the optical axis direction, and the operability of the focus lens 104. In the rough adjustment mode, the lens microcomputer 111 sets the control gain G to the second or higher order function or exponential function (S105). In this case, the coefficients are set such that the function can be continuous and smooth at the threshold. While the example of FIG. 2B is used, the example of FIG. 2C may be used.

Next, the lens microcomputer 111 calculates the moving amount Fpls of the focus lens 104 as follows using the control gain G and the rotating pulsed number P of the manual focusing ring 130 (S106):

$$Fpls = G \times P \quad (1)$$

Next, the lens microcomputer 111 calculates the moving speed Fspd of the focus lens 104 as follows using the predefined processing period T used to issue a focus lens driving command, and the moving amount Fpls of the focus lens 104 calculated in S106 (S107):

$$Fspd = Fpls/T \quad (2)$$

Next, the lens microcomputer 111 outputs a driving instruction of the focus lens 104 to the driving circuit 120 based upon the focus lens moving amount Fpls and the focus lens moving speed Fspd (S108).

In S107, in accordance with FIG. 2B, the moving speed Fspd of the focus lens 104 may be calculated by multiplying the rotating speed of the manual focusing ring 130 by the control gain G. In other words, the focus lens moving speed corresponding to the rotating speed of the manual focusing ring 130 becomes a control value, and driving of the focus lens 104 is stopped when the rotation of the manual focusing ring 130 is stopped. This configuration also provides a similar effect.

This embodiment switches the control between the fine adjustment mode and the rough adjustment mode based upon the rotating speed of the manual focusing ring 130. This embodiment can handle both a case where the photographer increases the rotating speed so as to move the focus lens 104 to the position in which the object distance is significantly different and a case where the photographer slowly rotates the manual focusing ring 130 for the fine adjustment near the current position. In the fine adjustment mode, when the photographer rotates the wrist from a certain defocus position to a position beyond an in-focus position and returns to the in-focus position, the manual focusing becomes easy using the wrist angle. In the rough adjustment mode, the photographer can quickly move the focus lens 104 to the position in which the object distance is significantly different, with a small operating amount of the manual focusing ring 130. In addition, the bad operability can be prevented near the boundary position between the fine adjustment mode and the rough adjustment mode by avoiding frequent occurrences of the radical accelerations and decelerations of the focus lens 104.

Second Embodiment

Figure 4:
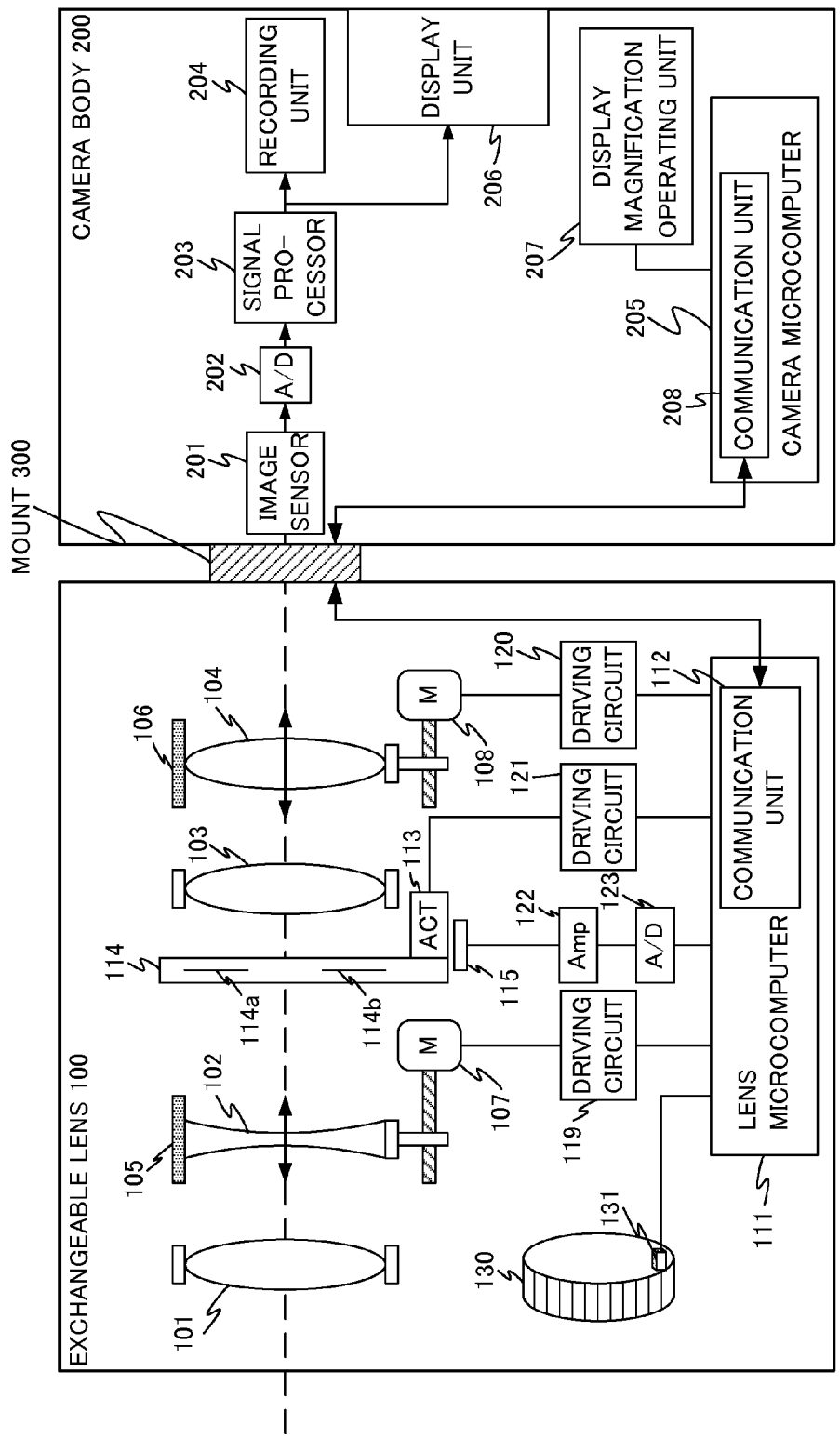
FIG. 4 is a block diagram of an optical apparatus according to a second embodiment of the present invention.

FIG. 4 is a block diagram of a camera system (optical apparatus) according to a second embodiment, and is different from FIG. 1 in that a display magnification operating unit 207 is added. The display magnification operating unit 207 is an operating unit that is operated in changing the display magnification of the object image displayed on the display unit 206 in the camera body 200. In this embodiment, the lens microcomputer 111 provides control of the fine adjustment mode when the display magnification operating unit 207 is enlarged, and provides control of the rough adjustment mode at the normal time (otherwise). This is because the photographer is likely to enlarge the magnification in the fine adjustment in the MF.

Figure 5A:
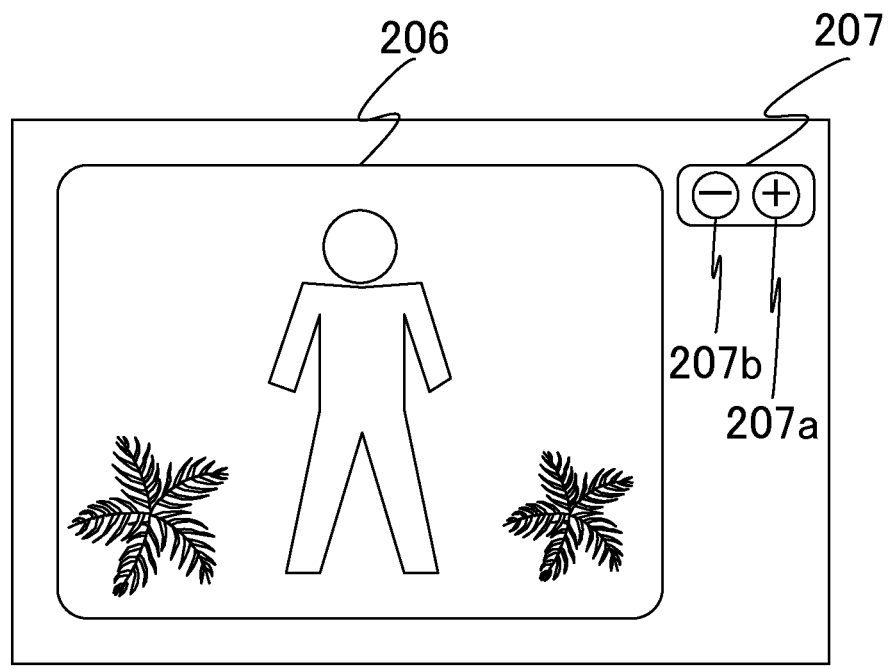
FIGS. 5A-5B are front views of a display unit and a display magnification operating unit illustrated in FIG. 4 according to the second embodiment.

FIG. 5A illustrates the state when the object is displayed on the display unit 206 with a standard magnification of once (normal image size), and the display angle of view is approximately the same angle of view as the actual pickup image recorded by the recording unit 204. In addition, while this embodiment also describes the control of the first embodiment described with reference to FIGS. 2A to 2C, this control is not mandatory. The photographer confirms the display screen with the standard magnification of once, moves the focus lens 104 to a nearly in-focus position in the rough adjustment mode, and moves the focus lens 104 to a position that is equal or very close to the in-focus position in the fine adjustment mode.

Figure 5B:
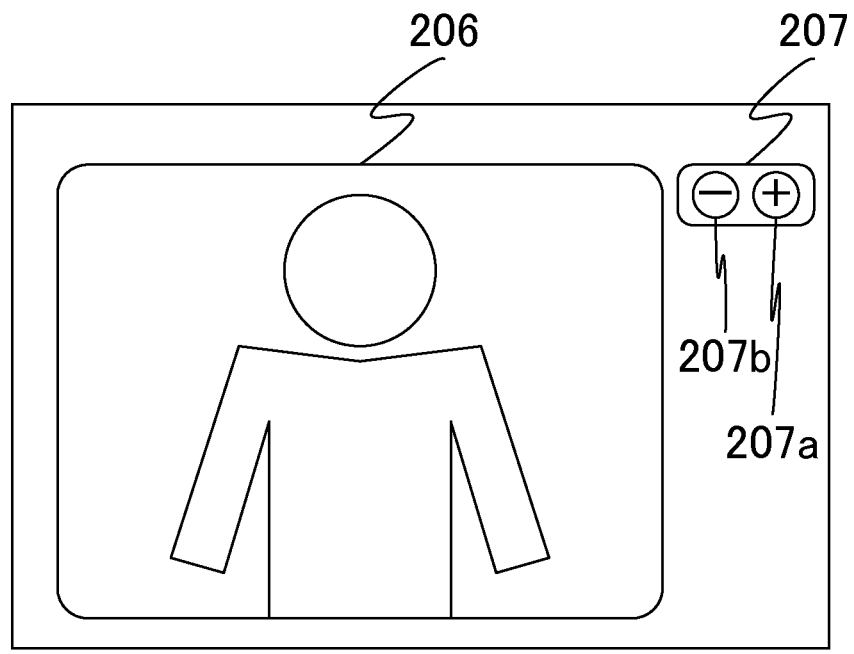

Next, as illustrated in FIG. 5B, the photographer enlarges the display magnification by manipulating an enlarging button 207a of the display magnification operating unit 207. In this embodiment, whenever the enlarging button 207a is pressed, the display magnification changes once, three times (treble image size), and five times (quintuple image size) in this order. Whenever a reducing button 207b is pressed, the display magnification changes five times, three times, and once in this order.

Figure 6A:
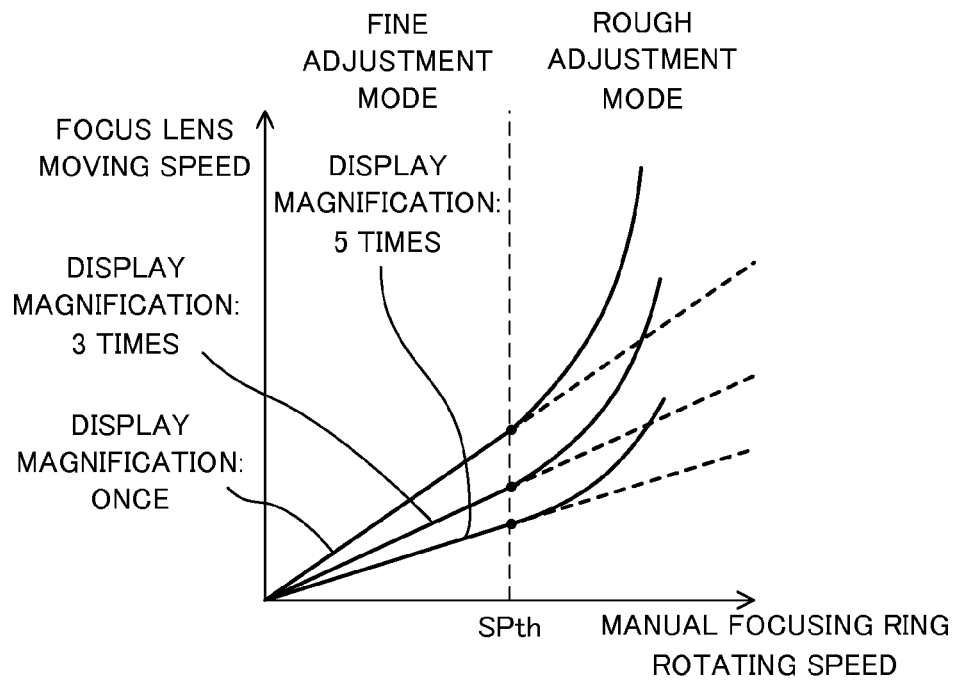
FIGS. 6A-6B are graphs each of which illustrates manual focusing control performed by a lens microcomputer illustrated in FIG. 4 according to the second embodiment.
Figure 6B:
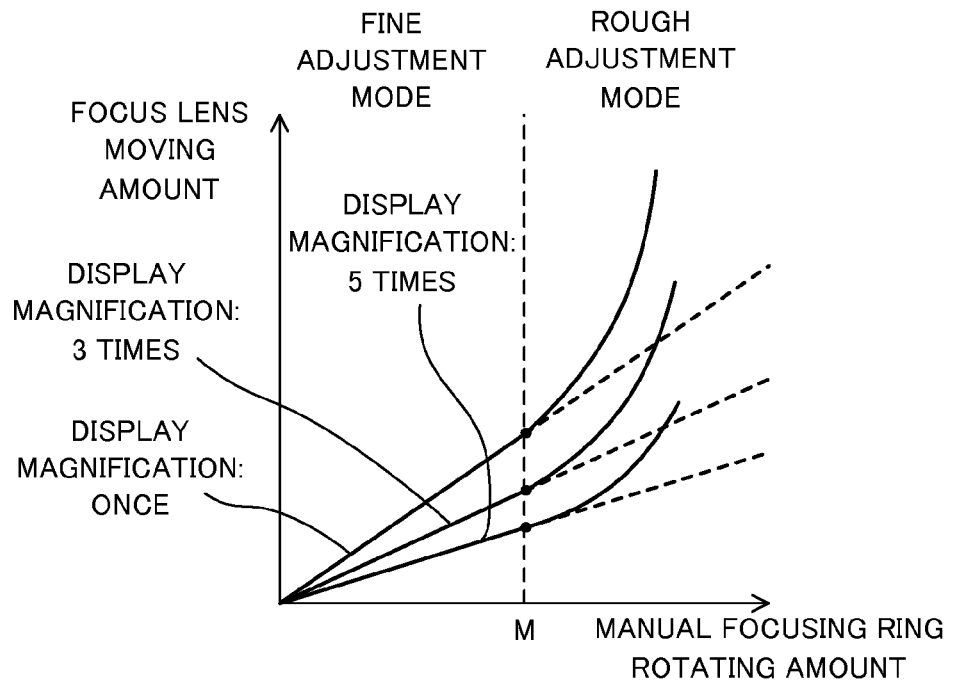

FIGS. 6A and 6B are graphs illustrating the MF controls performed by the lens microcomputer 111 according to this embodiment. The current display magnification of the display unit 206 is notified from the camera microcomputer 205 to the lens microcomputer 111.

FIG. 6A corresponds to FIG. 2B, and illustrates the relationship between the rotating speed of the manual focusing ring 130 and the moving speed of the focus lens 104. The moving speed of the focus lens 104 is expressed by the function of the rotating speed of the manual focusing ring 130, and the lens microcomputer 111 generates a control signal for the driver in accordance with this function similar to the first embodiment. This embodiment provides a plurality of functions corresponding to display magnifications of the display unit 206 configured to display the pickup object. In the plurality of functions, as the display magnification of the display unit 206 increases once, three times, five times, . . . , a differential value of the function in the same rotating speed of the manual focusing ring 130 reduces.

FIG. 6B corresponds to FIG. 2C, and illustrates the relationship between the rotating amount of the manual focusing ring 130 and the moving amount of the focus lens 104. The moving amount of the focus lens 104 is expressed by the function of the rotating amount of the manual focusing ring 130, and the lens microcomputer 111 generates a control signal for the driver in accordance with this function similar to the first embodiment. This embodiment provides a plurality of functions corresponding to display magnifications of the display unit 206 configured to display the captured object. In the plurality of functions, as the display magnification of the display unit 206 increases once, three times, five times, . . . , a differential value of the function in the same rotating amount of the manual focusing ring 130 reduces.

Thus, according to FIGS. 6A and 6B, the control gain is reduced as the display magnification increases, and a lower control curve is selected as the display magnification increases. While FIGS. 6A and 6B also illustrate the rough adjustment mode, this embodiment is particularly effective in the fine adjustment mode. Thus, the control curve in the fine adjustment mode illustrated in FIGS. 6A and 6B may be omitted, and the control curve only in the fine adjustment mode may be set. A finer adjustment can be realized by reducing the moving speed of the focus lens 104 to the rotating speed of the manual focusing ring 130 or by reducing the moving amount of the focus lens 104 to the rotating amount of the manual focusing ring 130. As a result, the MF precision can be improved.

Figure 7:
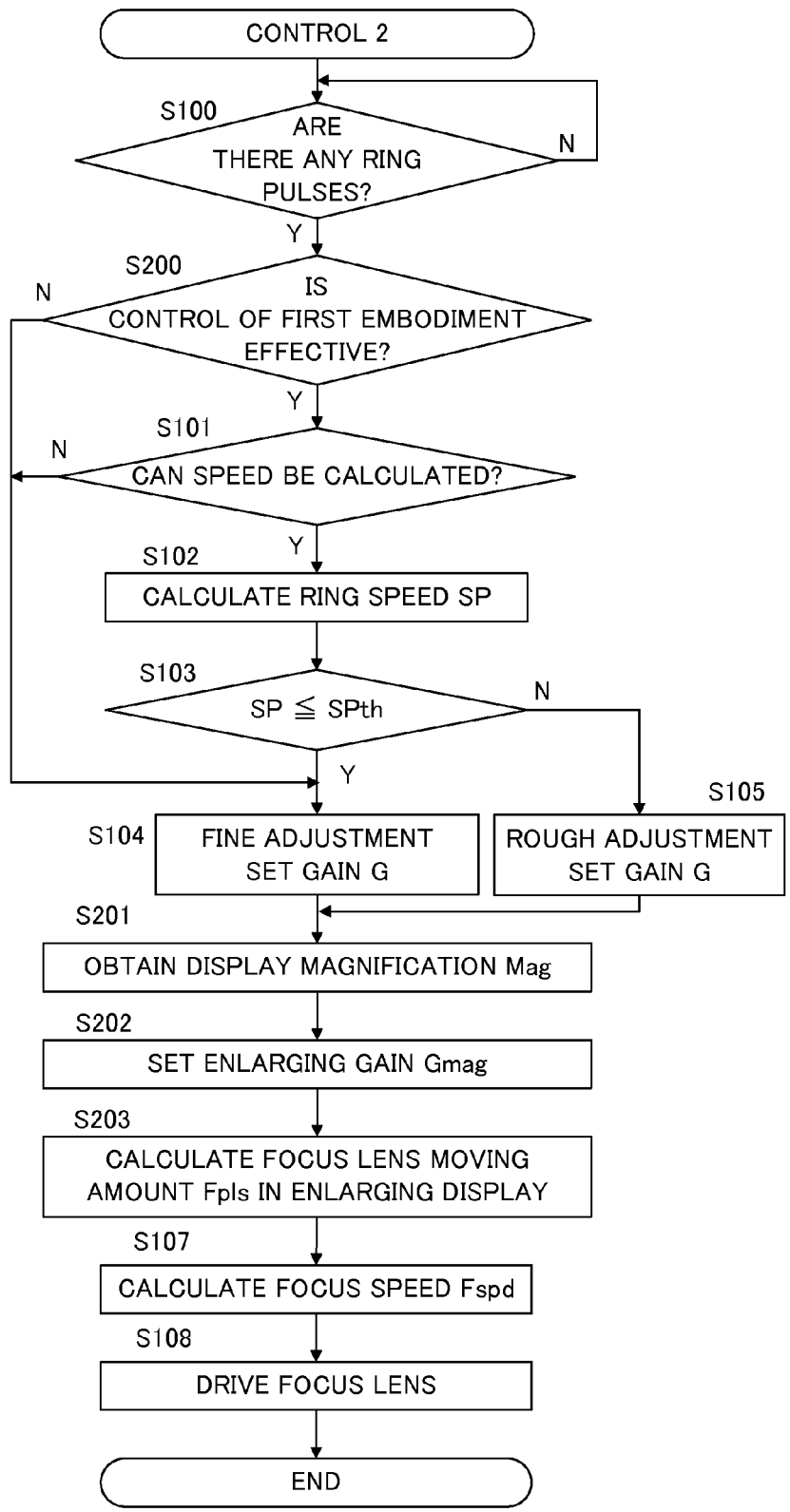
FIG. 7 is a flowchart for explaining a manual focusing control method performed by the lens microcomputer illustrated in FIG. 4 according to the second embodiment.

FIG. 7 is a flowchart of an MF control method (control 2) performed by the lens microcomputer 111 according to the second embodiment, and "S" stands for the "step." "N" stands for "No," and "Y" stands for "Yes." The flowchart illustrated in FIG. 7 can be implemented as a program that enables the computer to realize a function of each step. In FIG. 7, S200 to S203 are added to the flowchart illustrated in FIG. 3.

After S100, the lens microcomputer 111 determines whether the control of the first embodiment is effective, based upon the operating unit (not illustrated) provided to the exchangeable lens 100 (S200). When the control of the first embodiment is not effective (N of S200), the flow moves to S104 but in this case, the control of the fine adjustment mode is not different from the control of the rough adjustment mode and the control characteristic of the rough adjustment mode is expressed by the dotted extension line of the fine adjustment mode. When the control of the first embodiment is effective (Y of S200), S101 to S105 follow. In this case, in FIGS. 6A and 6B, the control of the fine adjustment mode is different from the control of the rough adjustment mode and the control having a control characteristic illustrated by a solid line is performed in the rough adjustment mode.

After S104 or S105, the lens microcomputer 111 obtains information of a display magnification Mag from the camera microcomputer 205 (S201).

Next, the lens microcomputer 111 obtains a control gain Gmag in accordance with the display magnification Mag (S202). The control gain becomes maximum when the display magnification is once (normal image size) or no enlargement, and the control gain becomes smaller than 1 when the display magnification is larger than 1. As the display magnification increases, the control gain reduces. More specifically, when the display magnification is three times or five times, a corresponding value is selected with reference to FIG. 6A or 6B. This configuration can provide precise MF because an intended position in the enlarged object can be easily focused.

Next, the lens microcomputer 111 calculates a moving amount Fpls of the focus lens 104 based upon the following expression (S203). Thereafter, S107 and S108 follow:

$$Fpls = G \times Gmag \times P \quad (3)$$

This embodiment can provide an optical apparatus configured to provide precise focusing as intended by a photographer by switching driving control processing upon the focus lens driver based upon rotating information of the manual focusing ring. In particular, in the fine adjustment, highly precise focusing can be provided with such control that the relationship between the ring rotating amount and the focus lens moving amount is a constant ratio characteristic. On the other hand, in the rough adjustment, quick focusing with a small operating amount can be provided with such control having a control ratio higher than that used for the fine adjustment operation and the ratio increases as the ring rotating speed increases. In addition, this embodiment can provide an image pickup apparatus configured to provide appropriate focusing as intended by the photographer by properly switching the driving control characteristic upon the focus lens driver based upon the display magnification of the display unit 206.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the camera microcomputer 205 rather than the lens microcomputer 111 may perform operations illustrated in FIGS. 3 and 7, calculates the moving amount and the moving speed of the focus lens 104, and notify them to the lens microcomputer 111.

This application claims the benefit of Japanese Patent Application No. 2012-043061, filed Feb. 29, 2012, which is hereby incorporated by reference herein in its entirety.

What is claimed is:

1. An optical apparatus comprising a controller configured to control driving of a focus lens by a driver in accordance with an operation of an operating unit in manual focusing:
    wherein a moving speed of the focus lens is expressed by a function of an operating speed of the operating unit, and the controller generates a control signal for the driver in accordance with the function,
    wherein when the operating speed of the operating unit is equal to or lower than a threshold, the function is such a linear function that the moving speed of the focus lens linearly increases as the operating speed of the operating unit increases,
    wherein when the operating speed of the operating unit is higher than the threshold, a differential value of the function increases as the operating speed of the operating unit increases, and
    wherein the function is continuous at the threshold, and the differential value of the function at the threshold used when the operating speed of the operating unit is equal to or lower than the threshold is equal to the differential value of the function at the threshold used when the operating speed of the operating unit is higher than the threshold.

2. The optical apparatus according to claim 1, wherein the optical apparatus further comprises the operating unit, the driver, and the focus lens.

3. The optical apparatus according to claim 1, wherein the optical apparatus is a camera body to which an exchangeable lens including the operating unit, the driver, and the focus lens is detachably attached.

4. An optical apparatus comprising a controller configured to control driving of a focus lens by a driver in accordance with an operation of an operating unit in manual focusing:
    wherein a moving amount of the focus lens is expressed by a function of an operating amount of the operating unit, and the controller generates a control signal for the driver in accordance with the function,
    wherein when the operating amount of the operating unit is equal to or lower than a threshold, the function is such a linear function that the moving amount of the focus lens linearly increases as the operating amount of the operating unit increases,
    wherein when the operating amount of the operating unit is higher than the threshold, a differential value of the function increases as the operating amount of the operating unit increases, and
    wherein the function is continuous at the threshold, and the differential value of the function at the threshold used when the operating amount of the operating unit is equal to or lower than the threshold is equal to the differential value of the function at the threshold used when the operating amount of the operating unit is higher than the threshold.

5. The optical apparatus according to claim 4, wherein the optical apparatus further comprises the operating unit, the driver, and the focus lens.

6. The optical apparatus according to claim 4, wherein the optical apparatus is a camera body to which an exchangeable lens including the operating unit, the driver, and the focus lens is detachably attached.

7. An optical apparatus comprising a controller configured to control driving of a focus lens by a driver in accordance with an operation of an operating unit in manual focusing:
    wherein a moving speed of the focus lens is expressed by a function of an operating speed of the operating unit, and the controller generates a control signal for the driver in accordance with the function, wherein a different function is provided for each display magnification of a display unit configured to display a pickup object, and wherein among a plurality of functions, a differential value of the function reduces at the same operating speed of the operating unit as the display magnification of the display unit increases.

8. The optical apparatus according to claim 7, wherein when the operating speed of the operating unit is equal to or lower than a threshold, the function is such a linear function that the moving speed of the focus lens linearly increases as the operating speed of the operating unit increases, wherein when the operating speed of the operating unit is higher than the threshold, a differential value of the function increases as the operating speed of the operating unit increases, and wherein the function is continuous at the threshold, and the differential value of the function at the threshold used when the operating speed of the operating unit is equal to or lower than the threshold is equal to the differential value of the function at the threshold used when the operating speed of the operating unit is higher than the threshold.

9. The optical apparatus according to claim 7, wherein the optical apparatus further comprises the operating unit, the driver, and the focus lens.

10. The optical apparatus according to claim 7, wherein the optical apparatus is a camera body to which an exchangeable lens including the operating unit, the driver, and the focus lens is detachably attached.

11. An optical apparatus comprising a controller configured to control driving of a focus lens by a driver in accordance with an operation of an operating unit in manual focusing:

wherein a moving amount of the focus lens is expressed by a function of an operating amount of the operating unit, and the controller generates a control signal for the driver in accordance with the function, wherein a different function is provided for each display magnification of a display unit configured to display a captured object, and wherein among a plurality of functions, a differential value of the function reduces at the same operating speed of the operating unit as the display magnification of the display unit increases.

12. The optical apparatus according to claim 11, wherein when the operating amount of the operating unit is equal to or lower than a threshold, the function is such a linear function that the moving amount of the focus lens linearly increases as the operating amount of the operating unit increases, wherein when the operating amount of the operating unit is higher than the threshold, a differential value of the function increases as the operating amount of the operating unit increases, and wherein the function is continuous at the threshold, and the differential value of the function at the threshold used when the operating amount of the operating unit is equal to or lower than the threshold is equal to the differential value of the function at the threshold used when the operating amount of the operating unit is higher than the threshold.

13. The optical apparatus according to claim 11, wherein the optical apparatus further comprises the operating unit, the driver, and the focus lens.

14. The optical apparatus according to claim 11, wherein the optical apparatus is a camera body to which an exchangeable lens including the operating unit, the driver, and the focus lens is detachably attached.

* * * * *